US00RE35262E

United States Patent [19]

Birk

[11] E Patent Number: Re. 35,262

[45] Reissued Date of Patent: Jun. 4, 1996

[54] EFFICIENT SINGLE-HOP DIRECTIONAL MULTICHANNEL SYSTEM

[75] Inventor: Yitzhak Birk, Palo Alto, Calif.

[73] Assignee: International Business Machines Corporation, Armonk, N.Y.

[21] Appl. No.: 301,951

[22] Filed: Sep. 7, 1994

Related U.S. Patent Documents

Reissue of:

[64] Patent No.: 5,146,514
Issued: Sep. 8, 1992
Appl. No.: 769,988
Filed: Sep. 30, 1991

[51] Int. Cl.[6] ..... G02B 6/00; G02B 6/36

[52] U.S. Cl. ..... 385/24; 359/115; 359/127

[58] Field of Search ..... 385/24, 46; 359/115, 359/127

[56] References Cited

U.S. PATENT DOCUMENTS

| | | | |
|---|---|---|---|
| 4,458,187 | 7/1984 | Heiman | 318/490 |
| 4,543,666 | 9/1985 | Witte et al. | 455/612 |
| 4,551,812 | 11/1985 | Gurr et al. | 364/492 |
| 4,914,648 | 4/1990 | Acampora et al. | 370/3 |

OTHER PUBLICATIONS

"On Optical Interconnection of Stations having Multiple Transmitters & Receivers" by Matthew T. Busche, et al., 1990 Inter. Symp. on Infor. Theory & its appl. (ISITA '90), Hawaii, U.S.A., Nov. 27–30, 1990 Session 63–3, pp. 967–970.

"On the Uniform–Traffic Capacity of Single–Hop interconnections Employing Shared Directional Multichannels", Internal IBM report #RJ 7859 (72519), Dec. 5, 1990.

*Primary Examiner*—Akm E. Ullah
*Attorney, Agent, or Firm*—Baker, Maxham, Jester & Meador

[57] ABSTRACT

A shared directional multichannel for efficiently transmitting $k=(\lceil \log_p n \rceil$ choose $(p-1)$ concurrent, non-interfering transmissions from a set of $m \geqq k$ source stations, each having p transmitters, to a set of n destination stations, each having one receiver, without active repeater components. The multichannel architecture permits implementation of an efficient single-hop multichannel system using optical star couplers in a manner that limits the power spreading loss to the n/p value known for bus-oriented networks instead of $n^2/p$. Several coupling stages are employed, each stage having a plurality of identical substantially-square directional couplers, to obtain channel concurrency k, which is an improvement over the concurrency p available in bus-oriented networks, without the higher power spreading loss normally arising from the larger number of connections between each source station and every destination station.

32 Claims, 4 Drawing Sheets m=n=4, $k=\log_2 n=2$

POWER SPLIT FACTOR = $n^2/2$

EFFICIENT SINGLE-HOP DIRECTIONAL MULTICHANNEL SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to single-hop multichannel communication networks in general, and more specifically, to a power-efficient, non-bus-oriented single-hop interconnect network architecture for optical signals.

2. Discussion of the Related Art

The evolution of modern data communications networks has steadily increased the demand for networks offering high data transmission speeds and high levels of data parallelism or channel concurrency. Data transmission rates are limited by the physical technology composing the network interconnection linkages. Channel concurrency is limited by the requirement that multiple transmissions remain distinguishable within the network when routed to the appropriate destinations. With standard bus-oriented network architectures, the number of concurrent transmissions is less than or equal to the number of buses.

A bus is a device used to completely interconnect a set of transmitters to a set of receivers. A network is said to be bus-oriented if all connections are made by buses and each transmitter and receiver is on only one bus. Optimal concurrency requires a protocol for transmitting data packets through a network without packet-to-packet interference. Ideally, a useful concurrency protocol should slow data transmission rates as little as possible, although all transmissions may be completely scheduled in advance or may occur according to an appropriate conflict resolution rule.

The prior art is replete with bus-oriented single-hop interconnection (SHI) techniques for improving channel concurrency within a communication network. Such techniques are not limited to any particular physical communication technology. Recent improvements in fiber optic transmission technology and the invention of the optical star coupler have given rise to explosive growth of optical network applications. Optical data transmission technology is favored because of the very high data transmission rates possible at optical frequencies. Unfortunately, optical bandwidth does little by itself to improve channel concurrency in switched networks. Without circuit components capable of optical switching speeds, concurrency limitations will continue to be an obtrusive handicap for optical data transmission networks.

Not surprisingly, practitioners in the art have suggested improved non-switched interconnection techniques for overcoming the limitations of bus-oriented optical interconnection. Some proposals were intended to overcome inherent limitations of optical interconnection devices, such as star couplers. For instance, in U.S. Pat. No. 4,543,666. Hans-Hermann Witte, et al. disclose a method for interconnecting N subscriber transmitters to N subscriber receivers using a plurality of optical star couplers. Witte, et al, use active optical repeaters to overcome the effects of line attenuation. Their invention exploits the directionality of star couplers to provide an echo-free bus-oriented interconnection architecture that improves channel capacity by simplifying the necessary bus protocol. However, as with optical switching devices, the use of active optical repeaters increases the costs and reduces the reliability of their bus-oriented network. Recent publicized telephone system failures in the U.S. highlight the effects of these problems.

In U.S. Pat. No. 4,914,648, Anthony Acampora, et al, disclose a bus-like Multiple Hop Interconnection (MHI) multichannel network that avoids the need for agile optical switching devices. Their channels are all bus-like because any two transmitters are either connected to exactly the same receivers or to disjoint sets of receivers. Acampora, et al, use a perfect shuffle network to simplify the necessary protocols under uniform traffic but they also pay the price of slower data transmission because of the multiple hops (repeated active packet transmissions) required by their invention.

For a discussion of bus-oriented and non-bus-oriented SHI networks, see Matthew T. Busche, et al, "On Optical Interconnection of Stations Having Multiple Transmitters and Receivers," 1990 International Symposium on Information Theory and its Applications (ISITA '90), Hawaii, U.S.A., Nov. 27–30, 1990, session 63-3, pp. 967–970. See also, Y. Birk, et al, "Bus-Oriented Interconnection Topologies for Single-Hop Communications among Multi-Transceiver Stations," IEEE Infocom'88, pp. 558–567, IEEE Computer Society Press, 1988. For an early discussion of non-bus-oriented networks, see Y. Birk, "Concurrent Communication Among Multi-Transceiver Stations Over Shared Media", PhD Dissertation, Stanford University, Dec. 1986.

As used in the art and discussed by Birk, uniform traffic means substantially equal data traffic across different "types" of source station transmitters. Scheduled traffic implies a round-robin transmission schedule and not a random or "on-demand" schedule. Strictly speaking, this means that there is the same amount of traffic between any source/destination pair. However, so long as the correct "types" of source stations transmit in each time slot and the destination are as scheduled, the full channel concurrency will be attained. Thus, if one source station of a given type has above average traffic for a given destination and another source station of the same type has less traffic for the same destination, the schedule can be modified to allocate additional slots to the former at the expense of the latter. A similar argument applies if source stations have a single transmitter and destination stations have multiple receivers. Moreover, even if the traffic is not exactly uniform, the resulting degradation in concurrency is gradual because only some of the time slots are underutilized. To operate an interconnection network with a given schedule, it is necessary to synchronize the stations so they know when to begin transmitting. This can be done using a central "clock" whose signal is distributed to all source station or by any other suitable means known in the art.

Multichannel capacity is defined as the product of data rate and concurrency, as is known in the art. Busche, et al, observe that m source stations having p transmitters per station can be interconnected with a destination stations having one or more receivers per station using either bus-oriented or non-bus-oriented SHI's. However, because maximum possible transmission rate is believed to be inversely proportional to the power loss along the path, they suggest that the optical power-split losses in passive non-bus-oriented SHI multichannel networks using multiple optical star couplers will limit the maximum possible multichannel capacity to less than the capacity already available in bus-oriented SHI networks.

Birk discusses non-bus-oriented SHI's that are organized so that each transmitter of a source station (SS) is directly connected to some set of destination stations (DS's), where the sets of DS's for different SS's can be chosen independently of one another. This concept differs from bus-oriented SHI's, which require the sets of DS's connected to any two transmitters, one from each of two distinct SS's, to be either identical or disjoint. Succinctly, a bus-oriented SHI is limited to a concurrency of p (number of transmitters per SS) but has an optimal power spreading loss factor of n/p.

For SS's having p=2 transmitters, a passive non-bus-oriented SHI of m SS's to n DS's with direct connections from each SS to every DS is limited in size to about n=20 or so because the power transmitted by each SS is divided by $n^2/2$ at every DS. This division occurs because of the two star coupler stages needed to make such a connection. A first (1 by n/2) star coupler splits the signal transmitted from a single SS transmitter to n/2 branches and a second (n by 1) star coupler joins all SS outputs destined for a single DS input. As is known in the optical art, the star coupler introduces an optical power loss equal to the maximum of the number of outputs or inputs. Thus, in this example, both first and second coupler stages reduce optical signal power by n. The total network power-split loss is then n*n/2 or $n^2/2$

.

Increasing the number of optical transmitters to p at each SS will decrease the number of receivers that must sense a single transmitter, thereby increasing the power available at the DS receiver and reducing the effective power loss factor to $n^2/p$. Adding active devices can also increase available network connectivity, but only by increasing cost, complexity and reliability problems. Succinctly, such a non-bus-oriented SHI offers an improved concurrency of $k=(\lceil \log_p n \rceil$ choose $(p-1)=(\lceil \log_p n \rceil)!/(p-1)!/(\lceil \log_p n \rceil -p+1)!$ but suffers with an optimal power spreading loss factor of $n^2/p$.

There is a strongly felt need in the optical network art for such a high-concurrency passive SHI technique for interconnecting numbers of source stations and destination stations well above the existing practical limit of n=20. Increasing n is desired because it leads to increased non-bus-oriented multichannel capacity resulting from improved concurrency k. Of course, the theoretical upper limit on passive network size is governed the same linear power spreading loss factor n/p known for bus-oriented networks because each SS within a passive SHI network must be connected to every DS by a single-hop link. However, reducing the power spreading factor from $n^2/p$ to n/p would vastly improve passive network channel capacity at higher values of maximum concurrency k. Thus, a need is felt for an interconnection wiring technique that will reduce power spreading losses in passive non-bus-oriented SHI's from a factor of $n^2/p$ to a factor closer to the theoretically optimum value of n/p. The associated problems and unresolved deficiencies are clearly felt in the art and are solved by the present invention in the manner described below.

SUMMARY OF THE INVENTION

The present invention concerns a scheme for wiring the interconnection between a set of source stations (SS's), each having p transmitter outputs, and a set of destination stations (DS's) whereby the power loss and complexity are essentially proportional to n/p. It is a primary advantage of this invention that the parallelism or concurrency $k=(\lceil \log_p n \rceil$ choose $(p-1)=(\lceil \log_p n \rceil)!/(p-1)!/(\lceil \log_p n \rceil -p+1)!$ can be attained without resorting to active optical devices or multiple-hop interconnection (MHI) schemes or reducing data rate. This invention also minimizes the number of fibers and couplers required for implementing the interconnection.

An advantage of this invention is that the disclosed interconnection schemes can be applied to other technologies including microwave waveguides, electrical conductors and the like, as well as optical conductors.

An important feature of the invention is that the number of components and number of interconnections is optimized as well as the power spreading loss.

An object of the invention is to connect a set of m SS's, each with at least p=2 transmitters, to a set of n DS's, each with a single receiver, such that the power and complexity are essentially proportional to n/p.

It is another object of this invention to make such an interconnection without requiring active optical repeaters or amplifiers.

It is another object of this invention to make such an interconnection without requiring active optical repeaters or amplifiers.

It is yet another object of this invention to effect such an interconnection so that all SS's are connected to every DS by a single series of passive links, referred to as a "single hop".

It is yet another object of this invention to minimize the numbers of components and connections necessary to achieve such an efficient single-hop multichannel system.

In the described invention, the coupler stages necessary to directly connect SS output to DS inputs are combined in a manner that forces each coupler in the multichannel to have equal or nearly equal numbers of inputs and outputs. It is a particular advantage of such a combination that the power spreading loss through any single coupler is not substantially more than a factor equal to the number of coupler outputs.

Another feature of this invention exploits the connection symmetries among the DS's. In this scheme, the path from a SS transmitter is connected to a DS receiver through several coupler stages. These stages are necessary because of the non-bus-oriented nature of the symmetries, wherein no two receivers hear exactly the same set of transmitters. For the important case of p=2, the specifications for each of the three necessary coupler stages are determined by the following two rules:

(a) the product of the number of outputs of the first stage, the number of outputs of the second stage and the number of outputs of the third stage must be equal to the number of DS's divided by the number of transmitters (p) within each SS; and (b) the number of inputs and outputs for each coupler within any stage must differ by no more than one.

These rules result in an interconnection power spreading loss that approaches (for p=2) the theoretical minimum of n, which is the number of DS's. The method of this invention can be extended to cases where p>2 by exploiting symmetry, separating transmitters by "type", and merging and splitting the connections to obtain "square" couplers.

In networks where $k=\log_2 n$=integer, the power spreading loss will be precisely equal to (n). For networks where k is odd, where the number of SS's is not an even multiple of k, or where the number of SS's is not an even multiple of k, or where the number of DS's is not an exact multiple of $2^k$, this invention will result in an optimal power spreading loss somewhat greater than the theoretical minimum of (n).

This invention can be readily extended to odd values of k by augmenting either the DS's or SS's with dummy stations until $n=2^k$ with k even. The invention can be extended to the case where, for p=2, an even concurrency of $(\log_2 n)+1$ can be achieved by renumbering all DS's with a list of all binary numbers between zero and (2n−1) having exclusively odd parity (or exclusively even parity).

An alternative embodiment for reducing power loss in a passive optical interconnection exploits the symmetry among SS's partitioned by "type" into groups having no more than k members. Because any two SS's having the same number (i modulo k) are identically connected to the n DS's, a single stage of (n/k) by (n/2) star couplers followed by a final stage of k by 1 couplers can be used to make the connections. An important advantage of this alternative embodiment is that the power-split loss is reduced from $n^2/2$ to $n*\log_2 n/2$, a substantial improvement over the straightforward interconnection technique known in the art.

Advantageously, interconnections made according to the invention can be used to carry analog as well as digital information. Another benefit is that a signal follows a unique path from each SS to each DS, thereby avoiding any possibility of self-interference arising from multipath transmissions. Another feature of this invention is that mutual interference can be avoided by scheduling no more than k concurrent transmissions chosen to prevent the simultaneous arrival of more than one signal at any DS in a manner obvious to practitioners in the optical network arts. One schedule that achieves the claimed concurrency is described by Birk, et al in their 1990 reference cited and incorporated below.

The described invention has application to non-bus-oriented networks because the sets of DS's attached to transmitters of different SS's in the network need not be disjoint identical sets. However, these teachings may also be applied to bus-oriented single-hop interconnection architectures.

The foregoing, together with other features and advantages of my invention, will become more apparent with reference to the following specifications, claims, and the accompanying drawings.

BRIEF DESCRIPTION OF THE DRAWINGS

For a more complete understanding of the invention, reference is now made to the following detailed description of the embodiments illustrated in the accompanying drawings, wherein.

DISCUSSION OF THE PREFERRED EMBODIMENTS

Figure 1:
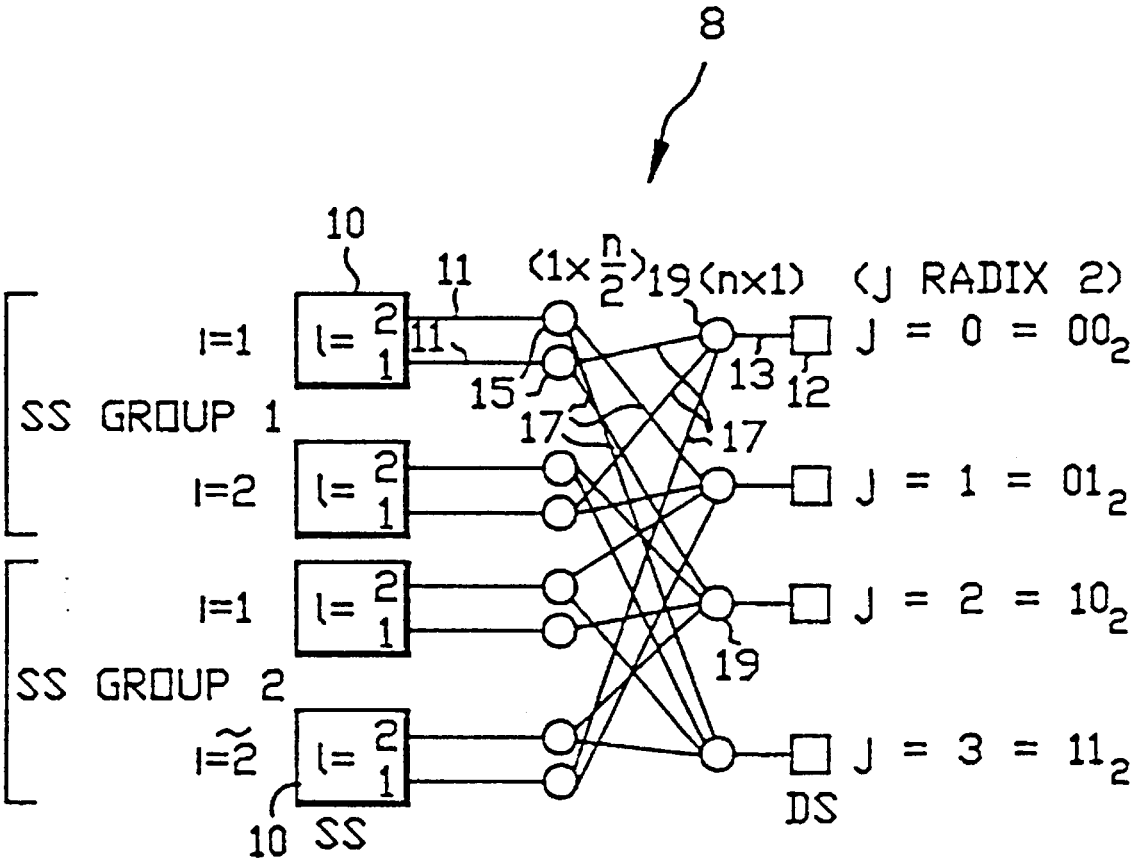
(PRIOR ART) FIGURE 1
FIG. 1 illustrates a single-hop interconnect network for the scheduled concurrent transmission k=2 messages.

FIG. 1 illustrates a prior art scheme for interconnecting source stations and destination stations with a non-bus-oriented structure. The prior art scheme does not, however, optimize power spreading loss. This scheme is discussed in detail by Y. Birk, et al, "On the Uniform-Traffic Capacity of Single-Hop Interconnections Employing Shared Directional Multichannels", IBM Research Report RJ7859 (72519), Dec. 5, 1990. This document is included herein in its entirely by the reference.

In FIG. 1, a shared directional multichannel 8 connects a set of n source stations (SS's), one of which is indicated by 10, each with p=2 transmitter outputs (reference numeral 11 on SS10), to a set of destination stations (DS's), one of which is indicated by 12, each with a single receiver input (reference numeral 13 on DS12). These two sets can also be the two halves of the same set of stations. For each (SS, DS) pair, the channel specifies which of the two SS transmitters can be heard by the DS receiver. Each SS is connected to all of the DS's by an arrangement of couplers and point-to-point transmission links. For example, each transmitter output 11 of the SS 10 is connected to an input port of a transmissive (1 by 2) coupler 15. Each of the two output ports of the coupler 15 is connected to a respective point-to-point transmission link 17. At the receiver input 13, a four-to-one transmissive star coupler 19 has each of its input ports connected to a point-to-point link from a respective one of the four couplers 15. The entire interconnection including output couplers, point-to-point passive links, and input couplers is referred to as a "multichannel".

With the connections chosen in the manner shown in FIG. 1 and transmission scheduled appropriately (e.g., as taught by Birk, et al in their 1990 reference cited and incorporated above), the illustrated multichannel can sustain $k=\log_2 n$ concurrent, non-interfering transmissions for a uniform traffic pattern.

The passive shared directional multichannel example shown in FIG. 1 is for n=4 DS's with the interconnections chosen to permit k=2 concurrent transmissions from two SS groups of two SS's each. Note that each SS is sequentially numbered from i=1 to k within each SS group. For each SS, p=2 individual transmitter outputs are numbered from l=1 to 2. Each DS has one receiver input and is numbered from j=1 to n. For the purposes of determining the individual connections, each DS is identified by a number (j radix 2) or binary j in the illustrated case. Each SS is connected directly to every DS through at least one transmitter output. There are no routing switches and no intermediate stations. The $i^{th}$ SS use the first (l=1) transmitter output 11 to connect to the $j^{th}$ DS only if the $i^{th}$ digit in the binary representation of the number j is zero (l−1=0); otherwise, the $i^{th}$ SS uses the second (l=2) transmitter for the connection (l−1=1).

In the multichannel scheme of FIG. 1, when a SS transmits using one of its transmitters, that transmission is heard by all DS's whose receivers are connected to that transmitter. A DS receives a message successfully if and only if that message is addressed to the DS and the DS cannot hear any other transmissions at the same time. When a DS hears two messages simultaneously, there is a "collision" and neither message is heard. By appropriately scheduling the transmissions, it is possible to transmit k messages concurrently (one from each SS type) without collision. When there are equal amounts of traffic between each SS and DS, this interconnection has a capacity of k conventional channels, yet each SS uses only two transmitters and each DS uses only one receiver. This interconnection is symmetric in the sense that the roles of SS and DS can be reversed with no change in capacity.

When there are more than k SS's, those with identical numbers (i modulo k) all have identical connections to the DS's with the scheme and are considered to be of the same "type". When the number of SS's equals the number of DS's, the two sets of stations can either be viewed as separate or simply as the two halves of the same n stations. Each transmitter is then connected to n/2 receivers and each receiver is connected to n transmitters as illustrated in FIG. 1.

The passive directional non-bus-oriented SHI network scheme described above for FIG. 1 lends itself to an implementation using optical fibers and directional star couplers. A directional star coupler is an element with several input fibers and several output fibers and is well-known in the art. An optical signal presented at any input is spread among all outputs but does not reemerge from any of the input fibers.

When all fibers used in a star coupler are of equal cross-sections, as is usually the case, the ratio of power presented at an input to that coming out of any output line is the maximum of the number of inputs or the number of outputs. Therefore, for the network shown in FIG. 1, an optical signal must travel through a (1 by n/2) coupler followed by a (n by 1) coupler and the power at the receiver is the transmitted power divided by $n^2/2$. This quadratic power-loss factor severely limits the number of stations that can be passively interconnected using the straightforward scheme illustrated in FIG. 1. Because direct (noncoherent) detection is normally used in optical networks, insufficient optical signal power requires that active devices be added to amplify the optical signals.

Any wiring of the interconnection shown in FIG. 1 must permit the signal from each transmitter output 11 to be split n/2 ways because it must reach n/2-receiver inputs 12 if every SS is to reach all n DS's and each SS has only two transmitter outputs 11. Similarly, n signals must be combined at each receiver input 13 because each DS is connected to n SS's in the example shown. Therefore the minimal theoretically possible power split factor is n/2.

In their December 1990 reference incorporated above, Birk et al teach a general connection rule for vales of $p \geqq 2$ without considering power spreading losses or wiring layout. The $n=p^k$ DS's (not shown) are numbered with vales of (j radix p) each having k digits. The values of j range from zero to $(p^k-1)$. The number of SS "types" is set to $k=(\lceil \log_p n \rceil$ choose $(p-1)=(\lceil \log_p n \rceil/(p-1)!/(\lceil \log_p n \rceil-p+1)!$ and each SS is represented by a k-digit binary number (i radix 2) having "1" in exactly (p−1) places and "0" in the (k−p+1) remaining places. Of course, for p=2, $k=(\log_2 n$ choose $(2-1)=\log_2 n$.

The rule for selecting the $1^{th}$ transmitter in the $i^1$ SS to be connected to the $j^{th}$ DS requires that the (p−1) digits of (j radix p) bu summed in the positions in which (i radix 2) has ones (summation of the digit by digit product of i*j). The resulting sum, modulo p, is the value of 1 required for the connection, where 1 ranges from zero to (p−1). This method and its extension to multichannels for multiple receivers as well as optimal transmission scheduling techniques will be best appreciated by referring to the 1990 Birk, et al reference incorporated above.

THE INVENTION

The invention provides a wiring scheme for the non-bus-oriented SHI network shown in FIG. 1 that attenuates the signal by only a factor of n/p and is optimal. The schemed of the invention also minimizes the number of fibers and couplers required for implementing the interconnection. The wiring scheme illustrated in FIG. 1 that makes direct connections from the outputs of couplers 15 to the inputs of couplers 19 separates the splitting and combining stages, thereby incurring the power budget penalty twice. In the splitting phase, the number of outputs of a first stage coupler 15 determines the power split ratio. In the combining phase, the number of inputs to a second stage coupler 19 determines the split ratio. The key element of this invention is the combination of the functions of these two stages so that each coupler in the connection path has equal or nearly equal numbers of inputs and outputs. Such a coupler is referred to hereinafter as a "substantially square" coupler. Preferably, the input port count of a substantially square coupler should differ from the output count by no more than one to minimize the power spreading loss in the multichannel.

Figure 2:
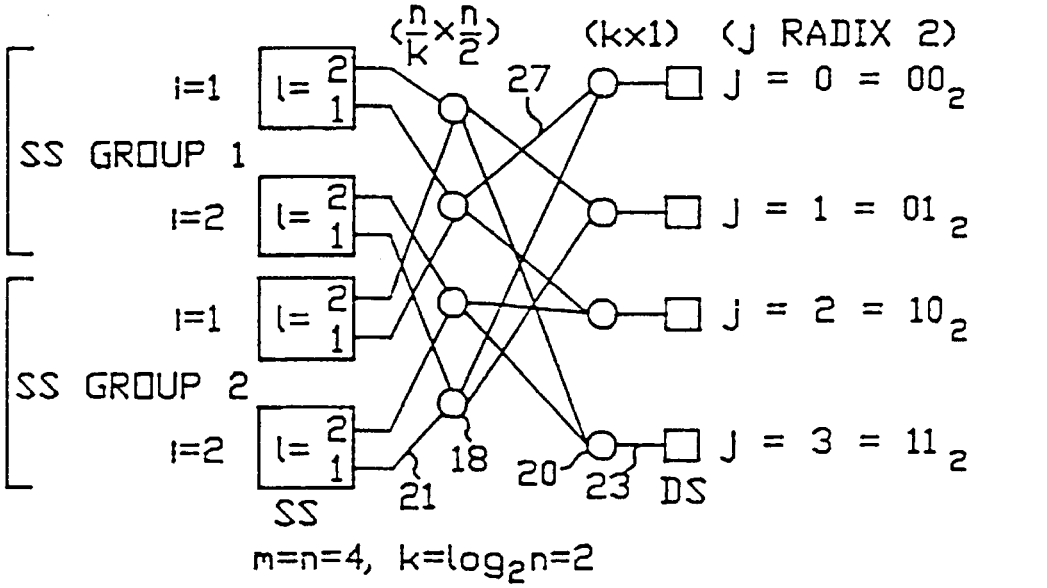
FIG. 2 illustrates a two-stage embodiment of the invention n=4 and k=2.

FIG. 2 shows a first interconnection scheme according to the invention for m=4 SS's and n=4 DS's using only two coupling stages. The nomenclature for FIG. 2 is similar to that discussed above in connection with FIG. 1. The network connection rule is that the $1^{th}$ transmitter output 21 of the $i^{th}$ SS within each SS group must be connected to receiver input 23 of the $j^{th}$ DS such that the $i^{th}$ digit of the integer (j radix 2) is equal to (l−1). The $i^{th}$ digit of binary integer j is determined by numbering from the least significant digit in the example shown in FIG. 2. When the numbering scheme is started at j=0 as shown, the $i^{th}$ digit may be determined in any consistent manner.

Because any two SS's with the same number (i modulo k) have identical connections, each set of individual transmitter outputs 21 (there are 2k such sets each with n/k such transmitter outputs) is first connected to the inputs of an (n/k) by (n/2) star coupler 18. The star coupler 18 replicates each transmitter output 21 (n/2) times and combines sets of (n/k) outputs 21 that are to reach the same receiver inputs 23. For any given receiver input 23, one output of each coupler 18 is connected to a k by 1 coupler 20. The output of coupler 20 is connected to receiver input 23. Examination of FIG. 2 will verify that the total power split factor of this scheme is $nk/2=n(\log_2 n)/2$, an expression that is always less than $n^2/2$. Thus, the scheme shown in FIG. 2 represents a substantial improvement in power-spreading loss over the straightforward scheme illustrated in FIG. 1.

For interconnection where n/k is not an integer, dummy SS's can be added until the total number is an integer multiple of k. That is, the SS group size is $\lceil n/k \rceil$, which is defined as the smallest integer greater than (n/k).

Figure 3:
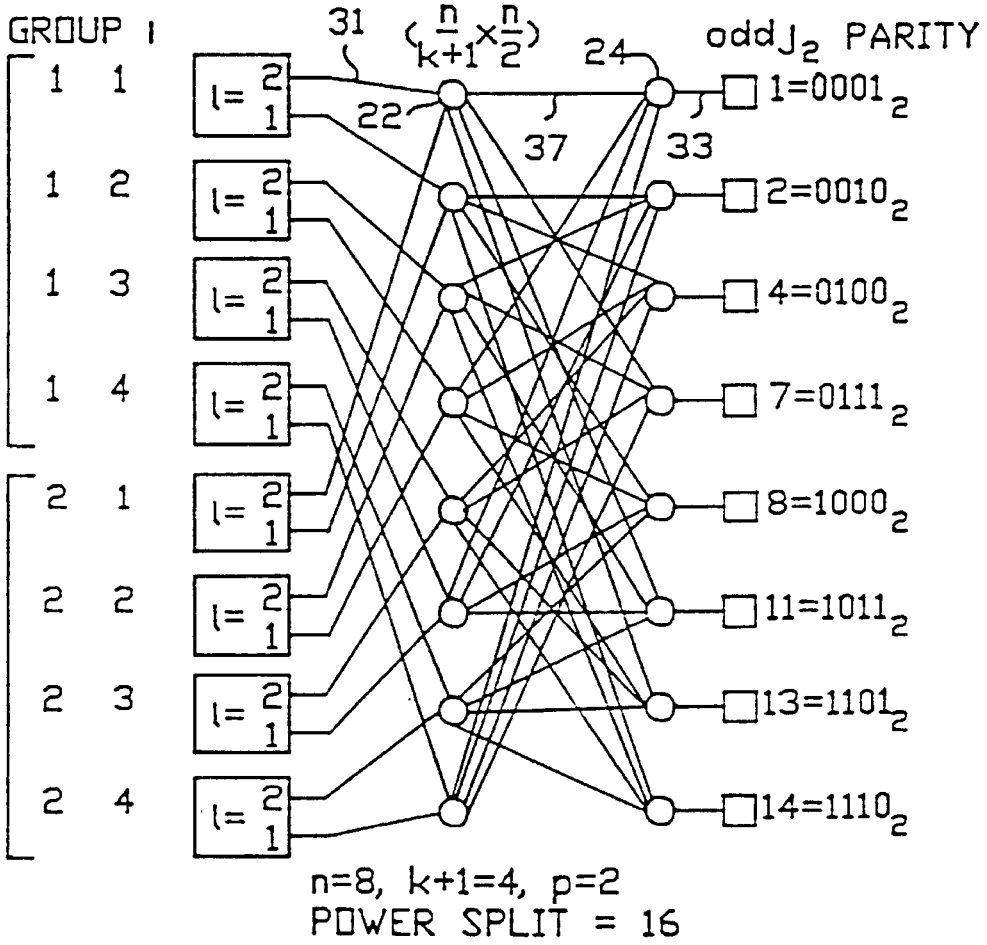
FIG. 3 illustrates a two-stage embodiment of the invention for n=8 and k+1=4.

For odd values of k, when p=2, the scheme shown in FIG. 2 can be extended to permit k+1 concurrent transmissions in the manner illustrated in FIG. 2. For this discussion, k is defined as before but concurrency is extended by one channel to k+1. FIG. 3 shows m=n=8 SS's divided into (n/k+1) SS groups, each SS within a group numbered from i=1 to (k+1), and n=8 DS's, which are numbered according to a special rule of this invention. If k were even, the concurrency would be limited to $k=\lceil \log_2 n \rceil$. Because k is odd, the concurrency can be increased to k+1 by numbering all the DS's with a binary number j selected from the group of numbers between 0 and $2^{k+1}-1$ according to the parity. As shown in FIG. 3, each of $2^{k+1}-1$ DS's is numbered with (j radix 2) having an odd parity. Of the 16 possible values for j, 8 odd parity and 8 have even parity. The 8 odd-parity values for j are used to number the 8 DS's in the manner shown in FIG. 3. Eight even-parity values are also available and can alternatively be used, as disclosed by Busche et al, cited above.

The remainder of the two coupling stage scheme for interconnecting n DS's and m SS's for odd values of k is identical to that discussed above in connection with FIG. 2. The first-stage star coupler is selected as a (n/(k+1) by (n/2) coupler 22. All individual transmitter outputs 31 of the same type (with identical connections) are then connected to the inputs of a coupler 22. The second stage coupler is defined as a (k+1) by 1 coupler 24 and the output of coupler 24 is connected to receiver input 33 in the manner shown. Finally, the outputs of couplers 22 are connected to the inputs of coupler 24 in a manner such that the $l^{th}$ transmitter output 31 of the $i^{th}$ SS within each SS group is connected to the receiver input 33 of the $j^{th}$ DS such that the $i^{th}$ digit of binary integer j is equal to (l−1). Because of the selection of values for j having odd parity from a group numbering $2^{k+1}-1$, each value of j has 4 bits, thereby permitting four sets of DS's to be systematically selected for k+1=4 concurrency.

Note that the power spreading factor for the scheme shown in FIG. 3 is 16. This compares favorably with the power spreading factor for FIG. 1 of $n^2=64$ but does not match the power spreading factor for FIG. 2 of nk/2=12. Thus, concurrency has increased to (k+1) in a manner that reduces the number of couplers required but does nothing to improve the power spreading factor that results form merely adding dummy SS's and DS's to force n=16 and proceeding to connect according to the rule discussed above for FIG. 2.

The next element of the invention is the addition of a third stage of couplers (stage-2) between the two stages used in the scheme discussed above in connection with FIG. 2, which takes advantage of connection symmetries on the DS side of the network. Recalling that the $l^{th}$ transmitter output 21 used by the $i^{th}$ SS to reach DS number j is determined by value of the $i^{th}$ bit in the binary representation of j, it follows that all DS's with binary numbers having the first (most significant) (k/2) bits in common also have identical connections to SS's of the first (k/2) types. Similarly, all DS's with numbers j having the last (k/2) bits in common also have identical connections to the SS's of the remaining (k/2) types. The number of such DS's in each case is $2^{k/2}$. The following discussion uses general values for n and k but may be best understood by referring to FIG. 5, which shows a three-stage coupler network for k=6 and n=64.

To take advantage of the symmetry, $2*2^{k/2}$ stage-2 couplers 34 are used. One-half of the stage-2 couplers 34 are used to provide all possible combinations of signals from the first (k/2) SS's (one transmitter output 51 from each SS in each combination), and the others are used to do the same for the remaining (k/2) SS's. Because each combination must reach some set of $2^{k/2}$ outputs.

A stage-2 coupler must have k/2 inputs because it combines this number of signals. Note that the total number of outputs for all stage-2 couplers is 2n. Each receiver input 53 must now be connected to the outputs of the two stage-2 couplers 34 that carry the combined signals of transmitter outputs 51 to which the respective DS must be connected. These two couplers 34 provide an output for the first half of the SS's and an output for the appropriate combination of the second half of the SS's. Thus, the third stage of couplers 36 are simply n couplers of size two by one.

Figure 5:
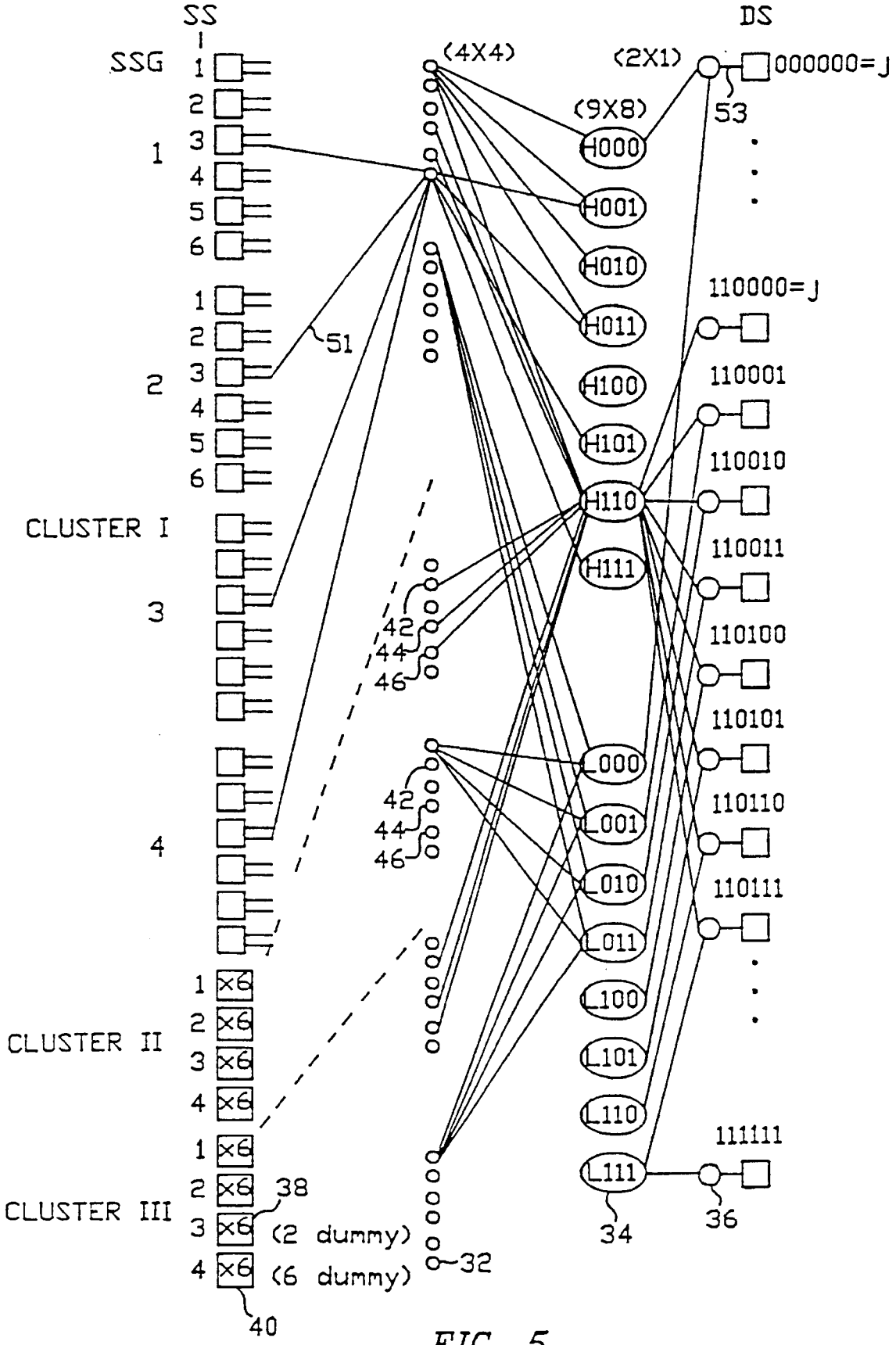
FIG. 5 illustrates a three-stage embodiment of the invention n=64 and k=6.

Because p=2, any given transmitter output 51 is used in only one-half of the combinations involving its SS. Thus, the stage-one couplers 32 must have one input and $(2^{k/2-1})$ outputs. FIG. 5 illustrates the optimal wiring scheme for k=6. Couplers are represented by circles or ellipses and stations represented by rectangles or squares.

The next element of the invention is a technique for breaking the merger of n/k signals into two steps. In the first step, groups of x signals from transmitter outputs 51 having identical connections are combined using x by y couplers. The integers x and y have values yet to be determined. In the second step, one output from each coupler is identified and those outputs are connected to the inputs of a new coupler, which completes the merger.

The next element of the invention is to let the x by y couplers serve as the stage-1 couplers 32 and let the stage-2 couplers 34 play both the role of completing the merger of n/k signals and their previous role of combination k/2 "types" of signals. Signals are of the same "type" if they come from the same $l^{th}$ transmitter of SS's having the same value of (i modulo k). The input count of a stage-2 coupler is therefore kz/2 for some integer z.

The final element of the invention is to select the best values of x, y and z. Because the number of receivers reached by each transmitter output 51 is n/2 (where p=2) and the stage-3 couplers 36 can only have one output, it follows that the product of the output count of a stage-1 coupler 32 and the output count of a stage-2 coupler 34 must be at least equal to n/2. To minimize the power split, this product is forced to be exactly equal to n/2 and the input count for any coupler is kept as close as possible to the output count for that coupler; that is, all couplers are forced to be "substantially square". These two conditions will minimize the power split in the 3-stage interconnection embodiment.

In the following steps, a method is disclosed for computing the actual coupler sizes and numbers required for a network of n DS's and m SS's where m≧k and where each DS has p=2 transmitter outputs. Although n, m and k are general, the following may be best understood by referring to FIG. 5.

(a) Stage-3 couplers 36 are (2 by 1) and n in number.

(b) Each transmitter output 51 must reach $2^{k/2-1}$ stage-2 couplers 34, which is the number of k/2-bit numbers in which one bit is fixed. Therefore, the output count for each stage-1 coupler 34 is $y=2^{k/2-1}$.

(c) The number of clusters of transmitter outputs 51 having identical connections that have not yet been combined is equal to z. This is simply z=(m/k)/x.

(d) An (x, z) combination is chosen that minimizes the power split for the 3-stage network. The first step in choosing (x, z) is to equate x and y, thereby making stage-1 coupler 32 exactly square. This forces $z=m/(kx)=2^{k/2+1}/k$. Thus, the number of inputs of stage-2 coupler 34 is $(k/2)*z=2^{k/2}=\sqrt{n}$. Conveniently, this is exactly the number of outputs of stage-2 coupler 34, thereby forcing all stage-2 couplers 34 to be substantially square.

The above expressions for the directional coupler input and output counts may not produce integer results. To obtain proper integer results, for even values of k:

(a) first compute a value for z and, if it is not an integer, perform the following two steps for both integer values of z adjacent the computed value;

(b) next compute a value for $x=\lceil 2^k/kz \rceil$ (closest greater integer) and add enough dummy SS's so that the total number of SS's is an integral product of kx. These dummy stations are added at the end of the actual SS's and neither they nor their connections actually exist; and (c) finally compute $y=2^{k/2-1}$ and compute the power-split factor equal $\max(x,y)*\max\{kz/2,2^{k/2}\}*2$. If there were two possible values of z, choose the value of z that results in the smallest power-split factor.

The above steps can be generalized for other values of p by similarly exploiting symmetries among the SS's and DS's to optimize the p>2 connection rule discussed above. For even values of k, the invention works naturally with k "types" of SS's; that is, for SS partitions where all SS groups have exactly k members except for a single group that may need to be filled with dummy SS's. For odd values of k, the invention works most simply with k+1 types of SS's. If desired, however, k types may be used for odd k and k+1 types for even k.

For values of p>2, additional coupling stages may be useful in optimizing the power-split loss to a value approaching n/p. In accordance with the invention, the first two or more coupling stages (all but the final stage) must be configured to meet the two important requirements: (a) product of coupling stage output counts equaling (n/p) and (b) all couplers being substantially square. The wiring requirements and coupler design procedure can be inferred without undue experimentation by extension of the methods discussed above in connection with the p=2 examples illustrated in FIGS. 4 and 5.

For odd values of $\log_2 n=k$, when p=2, the interconnection can be wired to obtain $\log_2 n+1$ concurrent transmissions in accordance with this invention in the following manner. First, each DS member is renumbered with a set of numbers j selected from zero to (2n−1) as discussed above in connection with FIG. 3. Each DS thus corresponds to a (k+1) bit number j, although only half the possible combinations are used. The bits in the remaining numbers are symmetric so that any combination of bit values occurs exactly half the number of times it would have occurred if all $2^{k+1}$ numbers were used. Couplers are then selected in accordance with the above-described schemes. Note that the number of outputs of the stage-2 coupler is now $2^{(k-1)/2}$. Also, clusters of SS's with identical connections now contain n/(k+1) SS's and there are now k+1 "types" of SS's.

Thus, for the special case where p=2 and concurrency equals k+1, the stage-1 and stage-2 couplers are identical square couplers having $2^{(k-1)/2}$ inputs and outputs and the stage-3 couplers are all 2 by 1 directional couplers.

Figure 4:
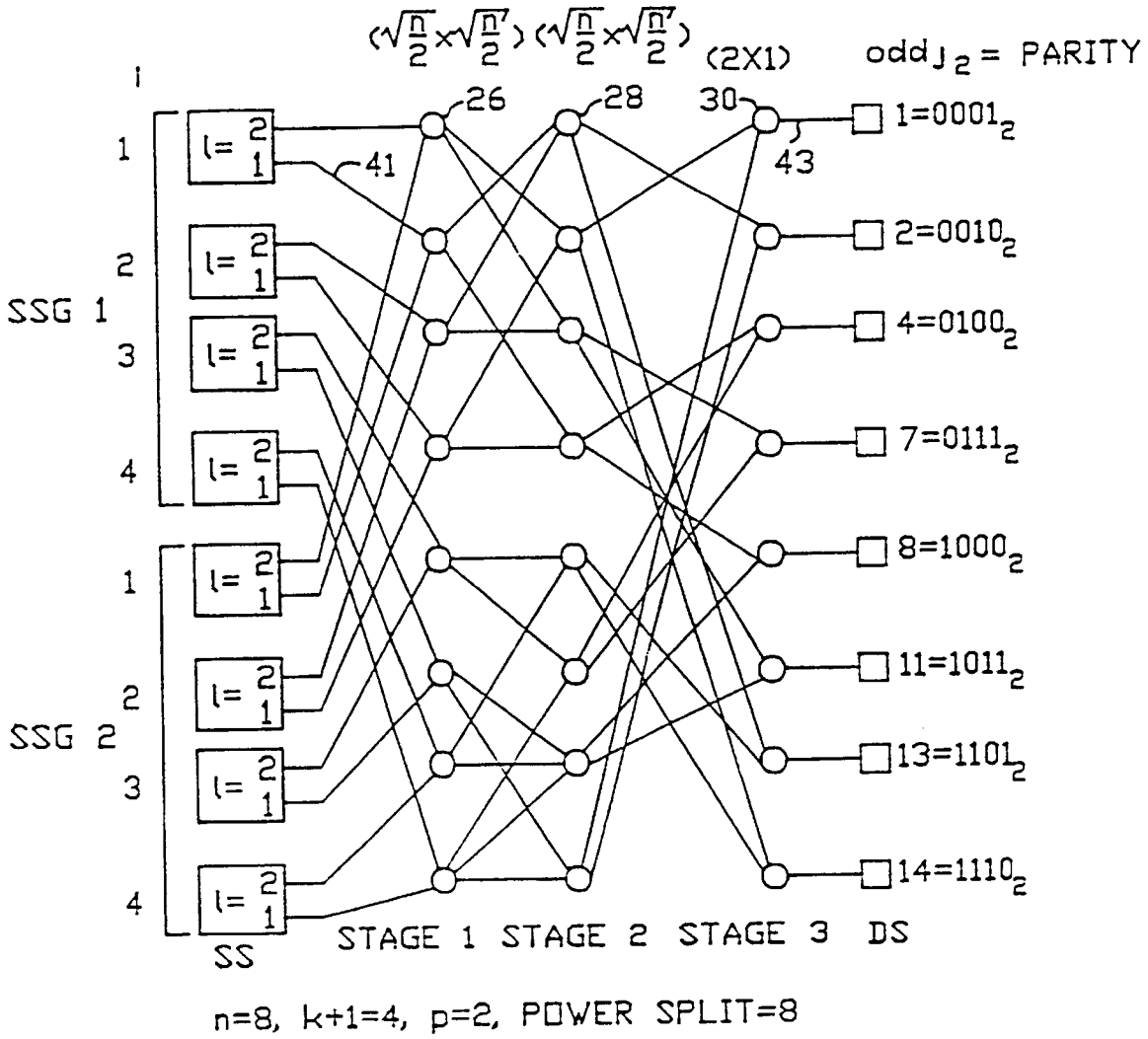
FIG. 4 illustrates a three-stage embodiment of the invention for n=8 and k+1=4.

FIG. 4 shows the same SS and DS configuration illustrated in FIG. 3, for n=8 and k+1=4. The same scheme for attaining concurrency of (k+1) for odd values of k is employed in connection with the scheme shown in FIG. 3. As before, values of j having only even parity could just as well be used. In FIG. 4, coupler stage 1 includes n=8 couplers 26, coupler stage 2 includes n=8 couplers 28 and coupler stage 3 includes n=8 couplers 30. The input and output counts for directional couplers 26, 28 and 30 are determined by the method described above for minimizing power-split loss with three coupler stages.

Referring to FIG. 4, note that stage-1 couplers 26 are (2×2) as are stage-2 couplers 28. Stage-3 couplers 30 are (2×1) and all connections between couplers 26, 28 and 30 are such that the $l^{th}$ transmitter output 41 of the $i^{th}$ SS within each SS group is connected to the receiver input 43 of the $j^{th}$ DS such that the $i^{th}$ digit of the odd parity integer j is equal to (l−1). Comparing the 3-stage implementation for n=8 and k+1=4 in FIG. 4 with the 2-stage multichannel of FIG. 3 for the same stations shows that the addition of a third stage has reduced the power-split factor from 16 to 8, thereby doubling the available power at each receiver input 43. The necessary transmission schedule for j having odd parity is a trivial extension of the even-parity schedule known in the art is disclosed in the Busche, et al reference cited above.

To understand the general case for even-valued k, consider the example in FIG. 5. A 3-stage interconnection is illustrated for concurrency k=6 between m=64 SS's and n=64 DS's. To compute the numbers specifying the stage-1 couplers 32, the stage- 2 couplers 34 and the stage-3 couplers 36, note that there are 64 stage-3 couplers, one per DS, each of size 2 by 1. Note that there are $2*2^{k/2}=16$ stage-2 couplers 34. The first eight couplers 34 represent all combinations of transmitter output 51 choices from the first k/2=3 "types" of SS's and the remaining eight represents the choice from the remaining three types of SS's. The number of outputs for stage-2 coupler 34 is $2^k/2=8$.

Because kz/2=3z=8, the trial values for z are two and three, and $y=2^{k/2-1}=4$.

Considering a first value for z=2, $x=\lceil n/kz \rceil=6$. The resulting power split is 6*8*2=96.

For z=3, $x=\lceil n/kz \rceil=4$. The resulting power split is 4*9*2=72. Thus, z=3 and x=4 are selected because that provides the minimum power split of 72. Note that in this example, it is not possible to force the power-split factor down to the ideal value of n=64 because of the asymmetry resulting from k=6 not being an exact power of p=2.

With x=4, the number of SS's is augmented with dummies to reach the smallest number that is an integer multiple of kx and also greater than or equal to n. This number is 72, which is reached by adding two dummy SS's to fill the third SS group 38 in cluster III and 6 dummy SS's to form a fourth SS group 40 within cluster III as best seen in FIG. 5. The interconnection is now constructed as follows.

(a) Partition the SS's in twelve SS groups of k=6, each containing one SS of each "type".

(b) Partition the SS groups into z=3 clusters of four groups each.

(c) In each cluster there are not four SS's in each "type" with identical connections (one SS in each of four SS groups). Select each set of four transmitter outputs 51 having identical connections and connect them to the four inputs of 4×4 coupler 32. The outputs of the stage-1 couplers 32 can now be viewed as three sets of SS's, each of which has one SS of each of the four types, and each transmitter of each such SS having four output lines carrying identical signals.

(d) Next connect outputs of the stage-1 couplers 32 to inputs of the stage-2 coupler 34 following the example of stage-2 coupler H110 seen in FIG. 5. Connect to H110 the second coupler 42 of the first pair in each set, the second coupler 44 of the second pair in each set and the first coupler 46 of the third pair in each set as best seen in FIG. 5.

(e) Finally connect one input of a stage-3 coupler 36 to the output of the stage-2 coupler Hxxx, where xxx is the value of the first (most significant) three bits in the binary DS number j, and connect the other input to the output of the stage-2 coupler Lyyy where yyy is the value of the last (leaf significant) three bits in the binary DS number j.

While the above discussion considers an exact method for construction of the multichannel wiring using either a 2-stage or a 3-stage interconnection for the most interesting case where p=2, the methods of this invention can easily be applied to other related networks. For instance, this invention can be used to optimize interconnection networks using couplers with more inputs and/or outputs than required (e.g. such as are available off the shelf). Also this invention can be applied to implementations that do not take full advantages of the scheme and use only a part of the elements or use them suboptionally. For example, a scheme that uses more inputs than necessary in the stage-3 couplers can be suboptimized using this invention. Also, the couplers defined by this invention can be implemented using a combination of a plurality of smaller optical star couplers in a manner well known in the art.

Obviously, other embodiments and modifications of this invention will occur readily to those of ordinary skill in the art in view of these teachings. Therefore, this invention is limited only by the following claims, which include all such obvious embodiments and modifications.

I claim:

1. A shared directional multichannel system for scheduled uniform traffic of up to k concurrent transmissions from m source stations to n destination stations, each said destination station including one receiver input, each said source station including p transmitter outputs and all said source stations being partitioned into at least one source station group such that no more than one said source station group contains less than k source stations, wherein k, m, n and p are positive non-zero integers and $m \geqq k = (\lceil \log_p n \rceil$ choose $(p-1)$, the system comprising:

a first stage including at least (p*k) first directional couplers, each said first directional coupler having $\lceil n/p \rceil$ outputs and no more $\lceil m/k \rceil$ inputs, all said inputs of each said first directional coupler being connected to transmitter outputs from a respective source station group;

a second stage including n second directional couplers, each said second directional coupler having at least k inputs and one output, said output being connected to a destination station receiver input; and interconnection means for coupling said first stage to said second stage by connecting said first directional coupler outputs to said second directional coupler inputs in a manner such that the $l^{th}$ transmitter output of the $i^{th}$ source station within each said source station group is connected to the receiver input of the $j^{th}$ destination station, where the modulo p sum of the digits of (j modulo p) in positions corresponding to unit digit positions in (i radix 2) is equal to $(l-1)$.

2. The shared directional multichannel system of claim 1, wherein:

p=2 and each said source station includes two transmitter outputs.

3. The shared directional multichannel system of claim 2 for scheduled uniform traffic of up to (k+1) concurrent transmissions from said source stations, wherein:

said source stations being partitioned into at least one source station group such that no more than one said source station group contains less than (k+1) source stations; and said interconnection means further includes means for connecting the $l^{th}$ transmitter output of the $(k+1)^{th}$ source station within each said source station group to the receiver input of the $j^{th}$ destination station, where the parity of binary integer j is equal to $(l-1)$.

4. The shared directional multichannel system of claim 3, wherein:

said first directional coupler includes at least one optical star coupler;

said second directional coupler includes at least one optical star coupler; and said interconnection means includes means for conducting optical signals.

5. The shared directional multichannel system of claim 4 wherein:

said optical star coupler stages comprise a plurality of smaller optical star couplers interconnected to form a single larger said coupler.

6. The shared directional multichannel system of claim 1, wherein:

said first directional coupler includes at least one optical star coupler;

said second directional coupler includes at least one optical star coupler; and said interconnection means includes means for conducting optical signals.

7. The shared directional multichannel system of claim 6 wherein:

said optical star coupler stages comprise a plurality of smaller optical star couplers interconnected to form a single larger said coupler.

8. The shared directional multichannel system of claim 1 wherein:

one or more source stations within at least one said source station group and the respective connections are absent.

9. A shared directional multichannel system for scheduled uniform traffic of up to k concurrent transmissions from m source stations to n destination stations, each said destination station having one receiver input, each said source station having two transmitter outputs and all said source stations being partitioned into at least one source station group such that no more than one said source station group contains less than k source stations and all said source station groups being partitioned into z clusters of no more than $\lceil m/kz \rceil$ groups, wherein k, m, n, and z are positive nonzero integers, $m \geqq k = \lceil \log_2 n \rceil$ and $z = m/kx$ is selected to minimize the value of $\{\max(x,y)*\max(m/(2x), n/(2y))\}$ where $y = \sqrt{n}/2$, said system comprising:

a first stage including $\lceil 2kz \rceil$ first directional couplers, each said first directional coupler having $\lceil \sqrt{n}/2 \rceil$ outputs and no more than $\lceil m/kz \rceil$ inputs, all said inputs of each said first directional coupler being connected to transmitter outputs from a respective source station group;

a second stage including $\lceil 2\sqrt{n} \rceil$ second directional couplers, each said second directional coupler having at least $\lceil kz/2 \rceil$ inputs and $\lceil \sqrt{n} \rceil$ outputs;

first interconnection means between said first stage and said second stage for connecting said first directional coupler outputs to said second directional coupler inputs such that the $l^{th}$ transmitter output of the $i^{th}$ source station within each said source station group is connected to the receiver input of the $j^{th}$ destination station, where the $i^{th}$ digit of binary integer j is equal to $(l-1)$;

a third stage of n third directional couplers, each said third directional coupler having two inputs and one output, said output being connected to a destination station receiver input; and second interconnection means between said second stage and said third stage for connecting said second directional coupler outputs to said third directional coupler inputs such that the $l^{th}$ transmitter output of the $i^{th}$ source station within each said source station group is connected to the receiver input of the $j^{th}$ destination station, where the $i^{th}$ digit of binary integer j is equal to $(l-1)$.

10. The shared directional multichannel system of claim 9 for scheduled uniform traffic of up to (k+1) said concurrent transmissions from said source stations, wherein:

said source stations are partitioned into at least one station group such that no more than one said source station group contains less than (k+1) source stations; and said first and second interconnection means each further includes means for connecting the $l^{th}$ transmitter output of the $(k+1)^{th}$ source station within each said source station group to the receiver input of the $j^{th}$ destination station, where the parity of binary integer j is equal to $(l-1)$.

11. The shared directional multi-channel system of claim 10 wherein:

said first directional coupler includes at least one optical star coupler;

said second directional coupler includes at least one optical star coupler;

said third directional coupler includes at least one optical star coupler; and said first and second interconnection means include means for conducting optical signals.

12. The shared directional multichannel system of claim 11 wherein:

said optical star coupler stages comprise a plurality of smaller optical star couplers interconnected to form a single larger said coupler.

13. A shared directional multichannel system according to claim 9 wherein:

said first directional coupler includes at least one optical star coupler;

said second directional coupler includes at least one optical star coupler;

said third directional coupler includes at least one optical star coupler; and said first and second interconnection means include means for conducting optical signals.

14. The shared directional multichannel system of claim 13 wherein:

said optical star couplers comprise a plurality of smaller optical star couplers interconnected to form a single larger said coupler.

15. The shared directional multichannel system of claim 9 wherein:

one or more source stations within at least one said source station group and the respective connections are absent.

16. A method for interconnecting a first set of m source stations of k types, each said source station having p transmitter outputs, to a second set of n destination stations, each said destination station having one receiver input, such that each source station is uniquely connected to every destination station by a single-hop directional connection whereby collision can be avoided by scheduling no more than k concurrent transmissions from said m source stations, wherein k, m, n and p are positive nonzero integers and $m \geqq k = (\lceil \log_p n \rceil \text{ choose } (p-1))$, the method comprising the steps of:

partitioning said m source stations into at least one source station group such that no more than one said source station group contains less than k source stations; and connecting the $l^{th}$ transmitter output of the $i^{th}$ source station within each said source station group to the receiver input of the $j^{th}$ destination station, where the modulo p sum of the digits of (j modulo p) corresponding to unit digit positions in (i radix 2) is equal to (l−1), each said connection including a first link between said $l^{th}$ transmitter output and an input of the first in a series of at least two coupling stages, each said coupling stage having a plurality of substantially square directional couplers, each said substantially square directional coupler including a first plurality of coupler inputs and a second plurality of coupler outputs where said first and second pluralities are substantially equal, with the outputs of each said coupling stage connected to the inputs of the immediately subsequent coupling stage, a penultimate link between an output of the last in said series of at least two coupling stages and an input of a final coupling stage of at least n number of final directional couplers, each said final directional coupler having p inputs and a single output, and a final link between the $j^{th}$ output of said final coupling stage and the receiver input of said $j^{th}$ destination station.

17. The method of claim 16, wherein:

p=2 and each said source station includes two transmitter outputs.

18. The method of claim 17 for uniform traffic of up to (k+1) concurrent transmissions, wherein:

in said partitioning step no more than one said source station group contains less than (k+1) source stations; and said connecting step includes the step of connecting the $l^{th}$ transmitter output of the $(k+1)^{th}$ source station within each said source station group to the receiver input of the $j^{th}$ destination station, where the parity of binary integer j is equal to (l−1).

19. The method of claim 18 wherein m=n, further including the step of co-locating every said source station within said first set with one respective said destination station within said second set.

20. The method of claim 16, further comprising, following said partitioning step, the step of:

selecting said first and second pluralities of inputs and outputs for said series at least two coupling stages of substantially square directional couplers so that the arithmetic product of the at least two said second pluralities of coupler outputs is substantially equal to (n/p).

21. The method of claim 16, wherein m=n, further including the step of co-locating every source station within said first set with one respective said destination station within said second set.

22. The method of claim 16, wherein said concurrent transmission, said transmitter outputs, and said receiver inputs include optical signals.

23. A method for interconnecting a first set of m source stations of k types, each said source station having p transmitter outputs, to a second set of n destination stations, each said destination station having one receiver input, such that each source station is uniquely connected to every destination station by a single-hop directional connection whereby collision can be avoided by scheduling no more than k concurrent transmission from said m source stations, wherein k, m, n and p are positive nonzero integers $m \geqq k = (\lceil \log_p n \rceil \text{ choose } (p-1))$, the method comprising the steps of:

partitioning m source stations into at least one source station group such that no more than one said source station group contains less than k source stations; and connecting the $l^{th}$ transmitter output of the $i^{th}$ source station within each said source station group to the receiver input of the $j^{th}$ destination station, where the modulo p sum of the digits of (j modulo p) in positions corresponding to unit digit positions in (i radix 2) is equal to (l−1), each said connection including a first link between said $l^{th}$ transmitter output of the $i^{th}$ source station and an input of a first coupling stage of at least (p*k) number of directional couplers each having $\lceil n/p \rceil$ outputs and no more than $\lceil n/k \rceil$ inputs, a second link between an output of said first coupling stage and an input of a second coupling stage of at least n number of directional couplers having no less than k inputs and one output, and a third link between an output of said second coupling stage and the receiver input of said $j^{th}$ destination station.

24. The method of claim 23, wherein:

p=1 and each said source station includes two transmitter outputs.

25. The method of claim 24 for uniform traffic of up to (k+1) concurrent transmission, wherein:

in said partitioning step no more than one said source station group contains less than (k+1) source stations; and said connecting step includes the step of connecting the $l^{th}$ transmitter output of the $(k+1)^{th}$ source station within each said source station group to the receiver input of the $j^{th}$ destination station, where the parity of binary integer j is equal to (l−1).

26. The method of claim 25 wherein m=n, further including the step of co-locating every source station within said first set with one respective said destination station within said second set.

27. The method of claim 23 wherein m=n, further including the step of co-locating every source station within said first set with one respective said destination station within said second set.

28. The method of claim 23 wherein said concurrent transmissions, said transmitter outputs, and said receiver inputs include optical signals.

*29. A shared directional multichannel system for scheduled uniform traffic of up to k concurrent transmissions from m source stations to n destination stations, all said source stations being partitioned into at least one source station group such that no more than one said source station group contains less than k source stations, wherein k, m, n and p are positive non-zero integers and* $m \geqq k = (\lceil \log_p n \rceil$ *choose* $(p-1))$, *said system comprising:*

*a plurality p of transmitter outputs in each said source station;*

*a receiver input in each said destination station; and*

*means for passively coupling optical signals from said source stations to said destination stations such that the power received at each said receiver input is greater than* $p/n^2$ *times the power transmitted from the respective said transmitter output.*

*30. The shared directional multi-channel system of claim 29, wherein said power received at said each receiver input is greater than* $(p/n/\log_p n)$ *times the power transmitted from said respective transmitter output.*

*31. A shared directional multichannel system for scheduled uniform traffic of up to k concurrent transmissions from m source stations to n destination stations, all said source stations being partitioned into at least one source station group such that no more than one said source station group contains less than k source stations, wherein k, m, n and p are positive non-zero integers, and* $m \geqq k = \lceil \log_2 n \rceil$, *said system comprising:*

*two transmitter outputs in each said source station;*

*a receiver input in each said destination station; and*

*means for passively coupling optical signals from said source stations to said destination stations such that the power received at each said receiver input is greater than* $2/n^2$ *times the power transmitted from the respective said transmitter output.*

*32. The shared directional multi-channel system of claim 31, wherein said power received at said each receiver input is greater than* $(2/n/\log_2 n)$ *times the power transmitted from said respective transmitter output.*

* * * * *

UNITED STATES PATENT AND TRADEMARK OFFICE

CERTIFICATE OF CORRECTION

PATENT NO. : Re. 35,262

DATED : June 4, 1996

INVENTOR(S) : Birk

It is certified that error appears in the above-indentified patent and that said Letters Patent is hereby corrected as shown below:

Col. 17 and 18, claims 29 through 32 should read as follows:

29. A shared directional multichannel system for scheduled uniform traffic of up to k concurrent transmissions from m source stations to n destination stations, [each said destination station including one receiver input, each said source station including p transmitter outputs and] all said source stations being partitioned into at least one source station group such that no more than one said source station group contains less than k source stations, wherein k, m, n and p are positive non-zero integers and $m \geq k = (\lceil \log_p n \rceil$ choose $(p - 1))$, [the] *said* system comprising:

*a plurality p of transmitter outputs in each said source station;*

*a receiver input in each said destination station; and* means for passively coupling optical signals from said source stations to said destination stations such that the power received at each said receiver *input* is greater than $p/n^2$ times the power transmitted from the respective said transmitter *output.*

30. The shared directional multi-channel system of claim 29, wherein said power received at [each] said *each* receiver *input* is greater than $(p/n/\log_p n)$ times the power transmitted from [the] *said* respective [said] transmitter *output.*

31. A shared directional multichannel system for scheduled uniform traffic of up to k concurrent transmissions from m source stations to n destination stations, [each said destination station having one receiver input, each said source station having two transmitter outputs and] all said source stations being partitioned into at least one source station group such that no more than one said source station group contains less than k source stations, wherein k, m, n and p are positive non-zero integers, and $m \geq k = \lceil \log_2 n \rceil$, said system comprising:

*two transmitter outputs in each said source station;*

*a receiver input in each said destination station; and* means for passively coupling optical signals from said source stations to said destination stations such that the power received at each said receiver *input* is greater than $2/n^2$ times the power transmitted from the respective said transmitter *output.*

UNITED STATES PATENT AND TRADEMARK OFFICE

CERTIFICATE OF CORRECTION

PATENT NO. : Re. 35,262

DATED : June 4, 1996

INVENTOR(S) : Birk

It is certified that error appears in the above-indentified patent and that said Letters Patent is hereby corrected as shown below:

32. The shared directional multi-channel system of claim 31, wherein said power received at [each] said *each* receiver *input* is greater than $(2/n/\log_2 n)$ times the power transmitted from [the] *said* respective [said] transmitter *output*.

Signed and Sealed this

Seventeenth Day of September, 1996

*Attest:*

Bruce Lehman

BRUCE LEHMAN

*Attesting Officer*

*Commissioner of Patents and Trademarks*